United States Patent
Hirata et al.

(10) Patent No.: US 10,668,835 B2
(45) Date of Patent: Jun. 2, 2020

(54) SEAT FOR VEHICLE AND DESIGNING METHOD OF THE SAME

(71) Applicant: MAZDA MOTOR CORPORATION, Hiroshima (JP)

(72) Inventors: Yoshito Hirata, Hiroshima (JP); Hiroki Uemura, Hiroshima (JP); Hiroaki Matsubara, Hiroshima (JP); Tomonori Ohtsubo, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 42 days.

(21) Appl. No.: 16/102,877

(22) Filed: Aug. 14, 2018

(65) Prior Publication Data

US 2019/0061568 A1 Feb. 28, 2019

(30) Foreign Application Priority Data

Aug. 23, 2017 (JP) ................. 2017-159954

(51) Int. Cl.
*B60N 2/04* (2006.01)
*B60N 2/06* (2006.01)
*B60N 2/16* (2006.01)

(52) U.S. Cl.
CPC .......... *B60N 2/1615* (2013.01); *B60N 2/045* (2013.01); *B60N 2/06* (2013.01); *B60N 2/165* (2013.01)

(58) Field of Classification Search
CPC ........ B60N 2/1615; B60N 2/045; B60N 2/06; B60N 2/165
USPC ..................... 296/65.01, 65.05, 65.13–65.15
See application file for complete search history.

(56) References Cited

U.S. PATENT DOCUMENTS

| | | | |
|---|---|---|---|
| 4,767,157 A | 8/1988 | Kazaoka et al. | |
| 5,145,232 A * | 9/1992 | Dal Monte | B60N 2/045 297/313 |
| 7,695,045 B2 * | 4/2010 | Takeda | B60N 2/06 296/75 |
| 2006/0169863 A1 | 8/2006 | Ohtsubo et al. | |
| 2009/0230730 A1 | 9/2009 | Ohtsubo et al. | |
| 2011/0233967 A1 * | 9/2011 | Ohtsubo | B60N 2/067 296/193.07 |

(Continued)

FOREIGN PATENT DOCUMENTS

| | | |
|---|---|---|
| GB | 2508857 A | 6/2014 |
| JP | S59-104832 U | 7/1984 |

(Continued)

OTHER PUBLICATIONS

An Office Action mailed by the German Patent Office dated Oct. 16, 2019, which corresponds to German Patent Application No. 10 2018 006 290.3 and is related to U.S. Appl. No. 16/102,877; with English language translation.

*Primary Examiner* — Gregory A Blankenship
(74) *Attorney, Agent, or Firm* — Studebaker & Brackett PC (57) ABSTRACT

In a seat for a vehicle which comprises a seat body, a slide mechanism, and a lift mechanism, the lift mechanism is configured such that a hip point of a specified physique occupant seated on the seat body draws a track which is approximated to a virtual rotational track of the hip point around a heel point when viewed from a vehicle side, whereby a change quantity of an ankle's angle is restricted below a first threshold and a change quantity of a knee's angle is restricted below a second threshold.

8 Claims, 8 Drawing Sheets

Forward　　　　　　　　　　Rearward (56) References Cited

U.S. PATENT DOCUMENTS

| | | | | |
|---|---|---|---|---|
| 2014/0238188 A1* | 8/2014 | Ito | ................ | B60N 2/0228 |
| | | | | 74/664 |
| 2014/0361592 A1* | 12/2014 | Kuno | ................ | B60N 2/045 |
| | | | | 297/325 |
| 2015/0097404 A1* | 4/2015 | Furuta | ................ | B60N 2/68 |
| | | | | 297/344.15 |
| 2015/0151653 A1* | 6/2015 | Furuta | ................ | B60N 2/68 |
| | | | | 297/344.15 |
| 2015/0202994 A1* | 7/2015 | Pywell | ................ | B60N 2/1615 |
| | | | | 297/344.12 |
| 2015/0203011 A1* | 7/2015 | Fujita | ................ | B60N 2/68 |
| | | | | 297/284.11 |
| 2015/0210188 A1* | 7/2015 | Hoshi | ................ | B60N 2/68 |
| | | | | 297/344.12 |
| 2015/0239373 A1* | 8/2015 | Weng | ................ | B60N 2/1615 |
| | | | | 297/216.1 |
| 2018/0099583 A1* | 4/2018 | Yagi | ................ | B60N 2/0232 |
| 2019/0061568 A1* | 2/2019 | Hirata | ................ | B60N 2/1615 |

FOREIGN PATENT DOCUMENTS

| | | |
|---|---|---|
| JP | S60-1037 A | 1/1985 |
| JP | H1-13635 Y2 | 4/1989 |
| JP | 2006-290074 A | 10/2006 |
| JP | 2008-024014 A | 2/2008 |
| JP | 2009-208636 A | 9/2009 |

\* cited by examiner

FIG. 1

Forward ← → Rearward

← Forward　　　　　Rearward →

Forward ← → Rearward

FIG. 8

← Forward  Rearward →

SEAT FOR VEHICLE AND DESIGNING METHOD OF THE SAME

BACKGROUND OF THE INVENTION

The present invention relates to a seat for a vehicle provided with a lift mechanism and a designing method of the same.

In general, there are provided a reclining mechanism to adjust inclination of a seat back of a seat body, a slide mechanism to adjust a position, in a longitudinal direction, of the seat body, and a lift mechanism to adjust a position, in a vertical direction, of the seat body at a driver's seat of an automotive vehicle. A driver can drive the vehicle in an appropriate driving position by adjusting the position of the seat body by means of the above-described mechanisms according to a driver's physique (body size).

As disclosed in Japanese Patent Laid-Open Publication No. 2008-24014, the lift mechanism of the seat for the vehicle generally comprises a link mechanism which interconnects the slide mechanism placed on a vehicle floor and the seat cushion of the seat body. A link member which constitutes the link mechanism is driven so as to rotate around an axis extending in a vehicle width direction according to operation by an occupant, whereby the seat body can be elevated or lowered.

Since elevating/lowering of the seat body by means of the lift mechanism is achieved by a rotational move of the link member as described above, the seat body is moved not only in the vertical direction but in the longitudinal direction during its elevating/lowering. In general, the seat body is moved obliquely forward and upward when being elevated by the lift mechanism. In this case, a hip point of the driver is suppressed from moving away from a pedal, such as an accelerator pedal or a brake pedal, more properly compared with a case where the seat body is moved straight up.

Herein, the applicant of the present patent application has been researched an ideal driving position from various perspectives in order to develop the automotive vehicle which enables the driver to drive the vehicle at will.

For example, it is desired for the driver to drive the vehicle in a relaxed position from perspectives of securing the operability of the pedal operated by the driver and reducing fatigue of driver's legs. In order to attain the relaxed driving position, it is requested that angles of respective joints of a lower half body of the driver shown in FIG. 8 (an ankle's angle A, a knee's angle B, and hip's angle C) fall in respective appropriate ranges. Further, it is preferable that the position of driver's eyes be set in an appropriate eye-line zone Z1 (see FIG. 1) from perspectives of obtaining proper senses of speed and distance, a sense of safety during high-speed driving, or the like.

Figure 3:
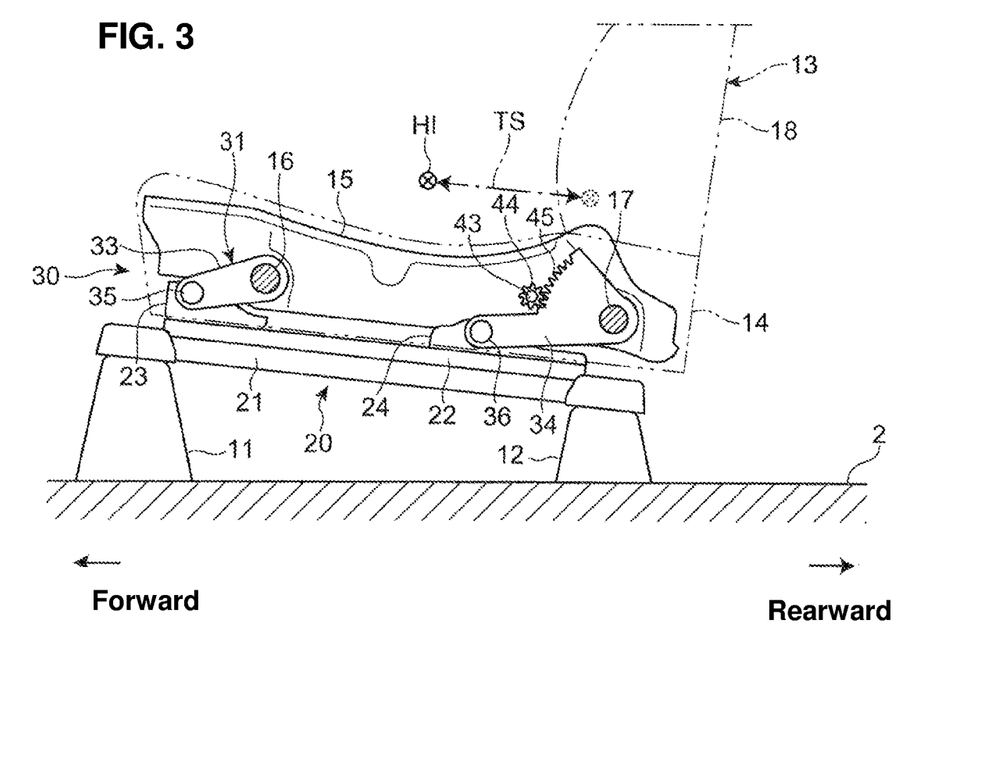
FIG. 3 is a side view showing a state where the seat is moved forward by the slide mechanism, which is similar to FIG. 2.

In general, the ankle's angle A, the knee's angle B, and the hip's angle C (see FIG. 3) are adjusted by the reclining mechanism and the slide mechanism, and the eye's position (height) of the driver is adjusted by the lift mechanism.

However, if the height adjustment by the lift mechanism is conducted after the above-described joint angles A, B, C have been adjusted by the slide mechanism and the like, there is a case where the ankle's angle A and the knee's angle B so change according to moving of a hip point HI that these angles A, B deviate from the respective appropriate ranges. In this case, readjustment by the slide mechanism and the like may be required for securing the appropriate driving position.

SUMMARY OF THE INVENTION

Accordingly, an object of the present invention is to provide a seat for a vehicle and a designing method of the same which can simplify the adjustment of the driving position based on a novel concept that a move track of the seat body operated by the lift mechanism is optimized.

The present invention is a seat for a vehicle which comprises a seat body arranged on a vehicle floor and including a seat cushion, a slide mechanism provided between the vehicle floor and the seat cushion and capable of sliding the seat body within a specified range, in a longitudinal direction, of the vehicle, and a lift mechanism provided between the slide mechanism and the seat cushion and capable of elevating/lowering the seat body within a specified range, in a vertical direction, of the vehicle, wherein the lift mechanism is configured such that a hip point of a specified physique occupant seated on the seat body which changes according to elevating/lowering of the seat body by the lift mechanism draws a track approximated to a virtual rotational track of the hip point around a heel point of the occupant when viewed from a vehicle side, whereby a change quantity of an angle of an ankle of the occupant is restricted below a first threshold and a change quantity of an angle of a knee of the occupant is restricted below a second threshold.

Herein, an entire length of the "range, in the vertical direction, of the vehicle" within which the seat body can be elevated/lowered by the lift mechanism is constant regardless of the position, in the longitudinal direction, of the seat body. However, in a case where the position, in the vertical direction, of the seat body changes according to moving, in the longitudinal direction, of the seat body by means of the slide mechanism, the height position of the "range, in the vertical direction, of the vehicle" by the lift mechanism changes accordingly.

In the present description, the "hip point" is determined at a single point according to the physique of the occupant and the position of the seat body, and the "heel point" is determined at a single point according to the physique of the occupant and the position of an accelerator pedal. Therefore, if the position of the accelerator pedal provided in the vehicle is constant, the heel point is determined at a single point according to the occupant's physique.

According to the above-described present invention, when the seat body on which the specified physique occupant is seated is elevated/lowered by the lift mechanism, the hip point of the occupant moves so as to draw the track approximated to the virtual rotational track of the hip point around the heel point of the occupant when viewed from the vehicle side. Thereby, changing (increase/decrease) of the distance between the heel point and the hip point of the occupant is suppressed, so that the change quantity of the ankle's angle of the occupant is restricted below the first threshold and the change quantity of the knee's angle of the occupant is restricted below the second threshold.

Thus, according to the present invention, as long as the driving position has been previously adjusted by the slide mechanism and the like so that the ankle's angle and the knee's angle of the occupant fall in the appropriate range, even if the height adjustment is conducted by the lift mechanism later, the ankle's angle and the knee's angle can be properly maintained within the appropriate range. Therefore, readjusting by means of the slide mechanism and the like can be omitted after the height adjustment by means of the lift mechanism, so that the adjustment of the driving position can be simplified.

In an embodiment of the above-described invention, when the seat body positioned in a specified region, in the longitudinal direction, of the vehicle is elevated/lowered from one end to the other end of the specified range, in the vertical direction, of the vehicle by the lift mechanism, the track which the hip point of the occupant draws is arranged such that the angle of the ankle of the occupant falls in a first range and the angle of the knee of the occupant is falls in a second range when viewed from the vehicle side.

According to this embodiment, as long as the seat body has been previously adjusted by the slide mechanism so as to be positioned in the specified region in the longitudinal direction, even if the seat body is elevated/lowered by the lift mechanism later, the ankle's angle of the specified physique occupant and the knee's angle of the specified physique occupant can be maintained at respective appropriate angles in the first and second ranges. Therefore, the readjusting by means of the slide mechanism and the like can be omitted after the height adjustment by the lift mechanism.

In another embodiment of the present invention, the slide mechanism comprises a rail which is attached to the vehicle floor and a slider which is interposed between the rail and the lift mechanism so as to slide along the rail, the seat cushion comprises a frame member which is provided to extend in the longitudinal direction along the slider, the lift mechanism comprises a link member which is rotatably connected to the slider at a front end portion thereof and rotatably connected to the frame member at rear end portion thereof, the rail and the slider are provided to slant relative to a vehicle horizontal plane such that front sides thereof are located at a higher level than rear sides thereof, and the frame member is connected to the slider such that the frame member slants with a front side thereof being located at a higher level than region side thereof when the seat body is positioned at a lower end of the specified range, in the vertical direction, of the vehicle.

Herein, the "vehicle horizontal plane" described in the present description means a plane which is perpendicular to the vehicle vertical direction.

According to this embodiment, the rail and the slider of the slide mechanism and the frame member of the seat cushion are both configured to slant forward and upward relative to the vehicle horizontal plane in a state where the seat body is positioned at the lower end of the specified range, in the vertical direction, of the vehicle. Thereby, the link member of the lift mechanism is configured such that its front end portion connected to the slider is positioned at a high level and its rear end portion connected to the frame member is positioned at a lower level than the front end portion. Accordingly, when the link member is rotated around its connection portion to the slider by the operation of the link mechanism, the connection portions to the link member and the frame member draw a track which includes an arc part having its tangential direction extending in the vehicle vertical direction in an region which is configured to be narrow in the longitudinal direction. Herein, the hip point which moves together with the frame member draws a similar track in the region configured to be narrow in the longitudinal direction.

Meanwhile, since a positional relationship between the heel point and the hip point of the occupant is configured such that a longitudinal distance between the heel point and the hip point is sufficiently large, compared with a vertical distance between the both, the virtual rotational track of the hip point around the heel point includes an arc part having its tangential direction extending in the vehicle vertical direction as well.

Accordingly, the track of the hip point which is actually drawn during the elevating/lowering by the lift mechanism can be arranged closely to the virtual rotational track of the hip point around the heel point of the occupant in the region configured to be narrow in the longitudinal direction (i.e., the longitudinally-narrow region). Thereby, the changing (increase/decrease) of the distance between the heel point and the hip point of the occupant and the changing of the ankle's angle and the knee's angle during the elevating/lowering by the lift mechanism can be suppressed properly, so that the adjustment of the driving position can be simplified effectively.

In another embodiment of the present invention, the front end portion of the link member is connected to the slider via a first axial member extending in a vehicle width direction, the rear end portion of the link member is connected to the frame member via a second axial member extending in the vehicle width direction, and the first axial member and the second axial member are provided to overlap each other in the vertical direction when the seat body is positioned at the lower end of the specified range, in the vertical direction, of the vehicle.

According to this embodiment, since the link member is positioned such that the first axial member connecting the front end portion of the link member to the slider of the slide mechanism and the second axial member connecting the rear end portion of the link member to the frame member of the seat cushion overlap each other in the vertical direction when the seat body is positioned at the lower end of the specified range, in the vertical direction, of the vehicle, the adjustment of the driving position can be simplified more effectively.

In another embodiment of the present invention, the link member comprises a front-side link member and rear-side link member which are provided to be spaced apart from each other in the longitudinal direction, and the front-side link member is shorter than the rear-side link member.

According to this embodiment, since the front-side link member provided between the slide mechanism and the seat cushion is shorter than the rear-side link member provided between the slide mechanism and the seat cushion, there occurs a difference in the radius between respective rotational tracks of the both link members. Accordingly, the inclination of a seat face of the seat cushion changes such that a relative height of a front end of the seat cushion to a rear end of the seat cushion decreases when the seat body is elevated by the lift mechanism. Thereby, the knee's angle of the occupant is suppressed from becoming smaller than the appropriate range, so that the ideal driving position can be maintained properly.

Another aspect of the present invention is a designing method of a seat for a vehicle comprising a seat body, a slide mechanism capable of sliding the seat body within a specified range, in a longitudinal direction, of the vehicle, and a lift mechanism capable of elevating/lowering the seat body within a specified range, in a vertical direction, of the vehicle, wherein the seat for the vehicle is designed such that when the seat body is elevated/lowered by the lift mechanism, a change quantity of an angle of an ankle of a specified physique occupant seated on the seat body is restricted below a first threshold and a change quantity of an angle of a knee of the occupant is restricted below a second threshold when viewed from a vehicle side.

According to the seat for the vehicle designed by the method of the present invention, the change quantity of the ankle's angle of the occupant is restricted below the first threshold and the change quantity of the knee's angle of the occupant is restricted below the second threshold when the seat body on which the specified physique occupant is seated is elevated/lowered by the lift mechanism. Therefore, according to the present invention, as long as the driving position has been previously adjusted by the slide mechanism and the like so that the ankle's angle and the knee's angle of the occupant fall in the appropriate range, even if the height adjustment is conducted by the lift mechanism later, the ankle's angle and the knee's angle can be maintained within the respective appropriate ranges properly. Accordingly, readjusting by means of the slide mechanism and the like can be omitted after the height adjustment by the lift mechanism, so that the adjustment of the driving position can be simplified.

In an embodiment of the above-described method of the present invention, an ideal region of a hip point of the occupant when viewed from the vehicle side is set such that the angle of the ankle of the occupant falls in a first range and the angle of the knee of the occupant falls in a second range, and a structure of the seat for the vehicle is designed such that a track which the hip point of the occupant draws when the seat body positioned in a specified region, in the longitudinal direction, of the vehicle is elevated/lowered from one end to the other end of the specified range, in the vertical direction, of the vehicle by the lift mechanism is positioned in the ideal region when viewed from the vehicle side.

According to the seat for the vehicle designed by the method of this embodiment, as long as the seat body has been previously adjusted by the slide mechanism so as to be positioned in the specified region, in the longitudinal direction, of the vehicle even if the seat body is elevated/lowered by the lift mechanism later, the ankle's angle of the specified physique occupant and the knee's angle of the specified physique occupant can be maintained at the respective appropriate angles in the first and second ranges. Therefore, the readjusting of the driving position by means of the slide mechanism and the like can be omitted after the height adjustment by means of the lift mechanism.

Other features, aspects, and advantages of the present invention will become apparent from the following description which refers to the accompanying drawings.

DETAILED DESCRIPTION OF THE INVENTION

Hereafter, an embodiment of the present invention will be described referring to the drawings. Herein, unless there is any particular description, the terms showing directions, such as "forward," "rearward," "rightward," "leftward," "upward," and "downward," mean respective directions relative to a vehicle in a case where an traveling direction of the vehicle advancing forward is the "forward" direction.

[Seat Structure]

Figure 1:
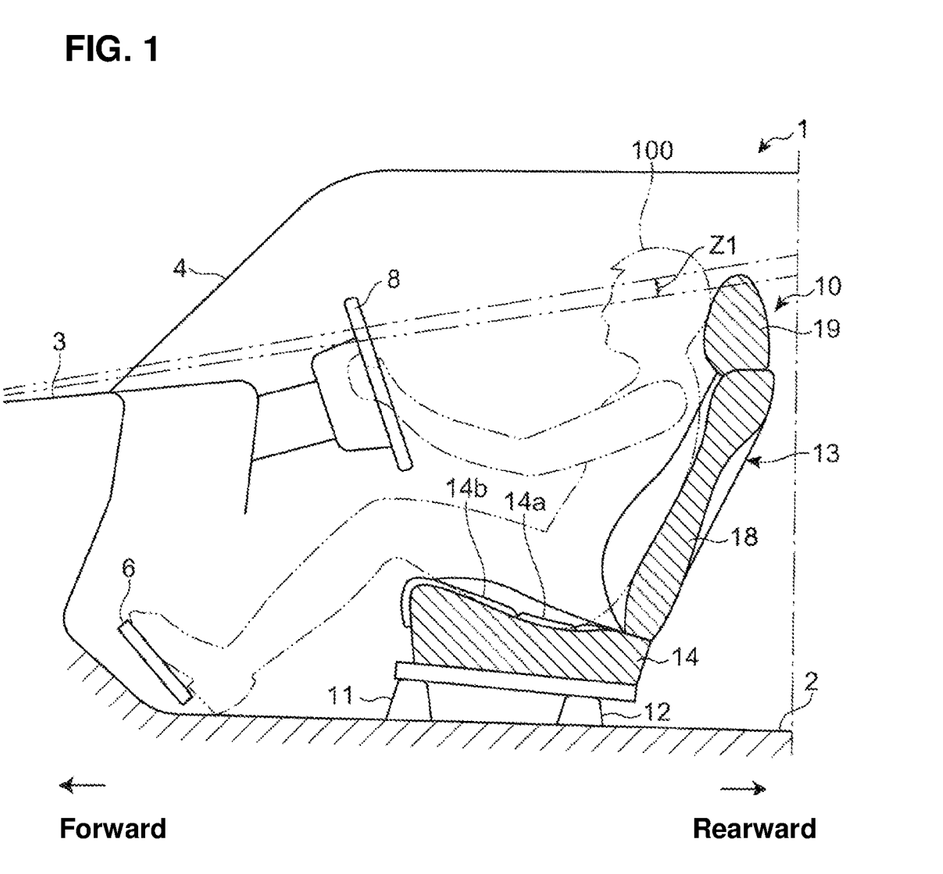
FIG. 1 is a side view showing a seat for a vehicle according to an embodiment of the present invention.

As shown in FIG. 1, a seat 10 for a vehicle (hereafter, referred to as "seat" simply) according to the present embodiment is a driver's seat which is provided at a vehicle 1. In the present embodiment, the vehicle 1 is a right-handle vehicle in which the driver's seat 10 is arranged on the right side of the vehicle, but the present invention is applicable to a left-handle vehicle in which the driver's seat is arranged on the left side of the vehicle.

In FIG. 1, reference character 2 denotes a floor panel, reference character 3 denotes a bonnet (engine hood), reference character 4 denotes a windshield, reference character 6 denotes an accelerator pedal, reference character 8 denotes a steering wheel, and reference character 100 denotes an occupant (driver) seated on the seat 10.

The seat 10 comprises a seat body 13 which is arranged on the floor panel 2. The seat body 13 comprises a seat cushion 14, a seatback 18, and a headrest 19. The seat body 13 is supported at the floor panel 2 via support members 11, 12 attached onto an upper face of the floor panel 2, and a slide mechanism 20 and a lift mechanism 30 (see FIG. 2) which are described later.

At a seat face of the seat cushion 14 are provided a hip support portion 14a which supports the buttocks of the occupant 100 and a thigh support portion 14b which supports the femurs of the occupant 100 at a position located in front of the hip support portion 14a. The thigh support portion 14b is provided to slant forward and upward.

Herein, the seat 10 may be provided with a seat-face tilt mechanism (not illustrated) which adjusts an inclination angle of the thigh support portion 14b. In this case, since the inclination angle of the thigh support portion 14b is adjusted at an appropriate angle by the seat-face tilt mechanism, it can be suppressed that a back side of the femurs is pressed or a gap occurs between the seat face and the femurs.

Figure 2:
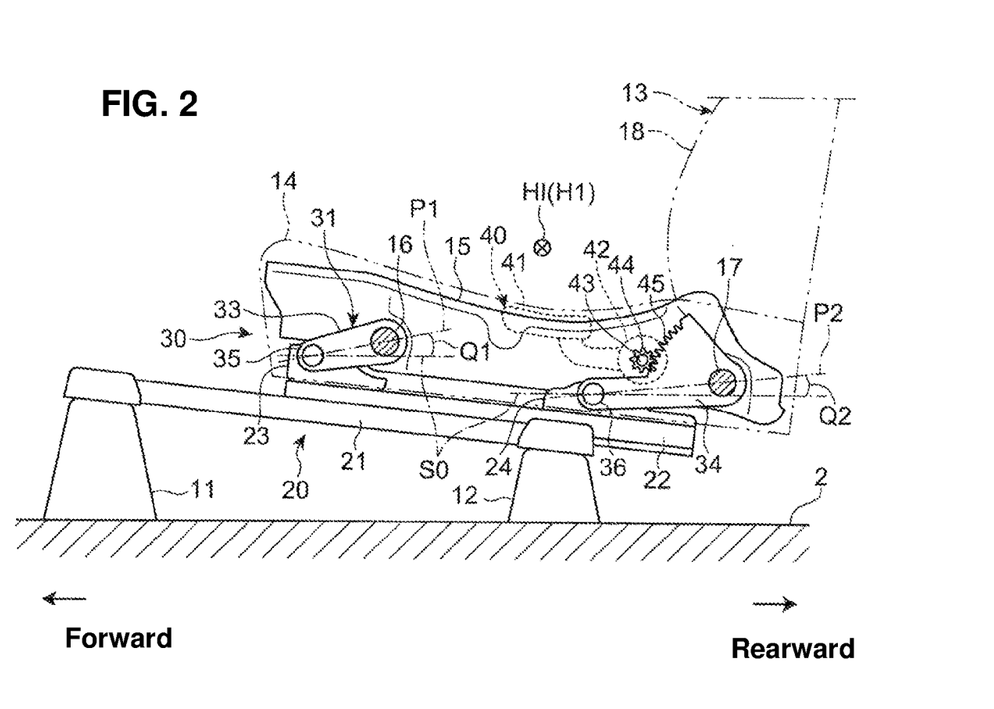
FIG. 2 is a side view showing a slide mechanism and a lift mechanism of a seat shown in FIG. 1.

As shown in FIG. 2, the seat 10 is provided with a slide mechanism 20 which is capable of sliding the seat body 13 within a specified range, in a longitudinal direction, of the vehicle (hereafter, referred to as a "slide range") and a lift mechanism 30 which is capable of elevating/lowering the seat body 13 within a specified range, in a vertical direction, of the vehicle (hereafter, referred to as an "elevating/lowering range").

Herein, the seat 10 is further provided with a reclining mechanism (not illustrated) which is known for adjusting an inclination angle of the seatback 18, specific description of which is omitted here.

The slide mechanism 20 comprises a pair of right-and-left rails 21 and a pair of right-and-left sliders 22. While the right-side rail 21 and the right-side slider 22, when viewed from an inward side, in the vehicle width direction, of the vehicle are illustrated only in FIG. 2, the left-side rail and slider are configured similarly to these right-side ones 21, 22.

The right-and-left rails 21 are arranged in parallel to each other such that these extend in the longitudinal direction. The rail 21 is a rail groove opened upward, for example. The rail 21 is fixed to the floor panel 2 via the above-described support members 11, 12 (see FIG. 1). The rail 21 is provided to slant forward and upward. An inclination angle of the rail 21 relative to a vehicle horizontal plane is set at 6 degrees, for example.

The slider 22 is engaged with the corresponding rail 21 so as to slide along this rail 21. The slider 22 is a long member extending in the longitudinal direction. The slider 22 is provided to slant forward and upward so as to correspond to the rail 21. A pair of front-and-rear brackets 23, 24 which are connected to the seat cushion 14 via the lift mechanism 30 are provided at the slider 22.

The slider 22 can be locked at the rail 21 by a known lock mechanism (not illustrated). Locking of the slider 22 by means of the lock mechanism can be released through an operation of an unlock lever by the occupant 100. In a state where the locking of the slider 22 is released, the slider 22 can slide on the rail 21, so that the seat body 13 can slide forward or rearward (see FIG. 3).

Figure 4:
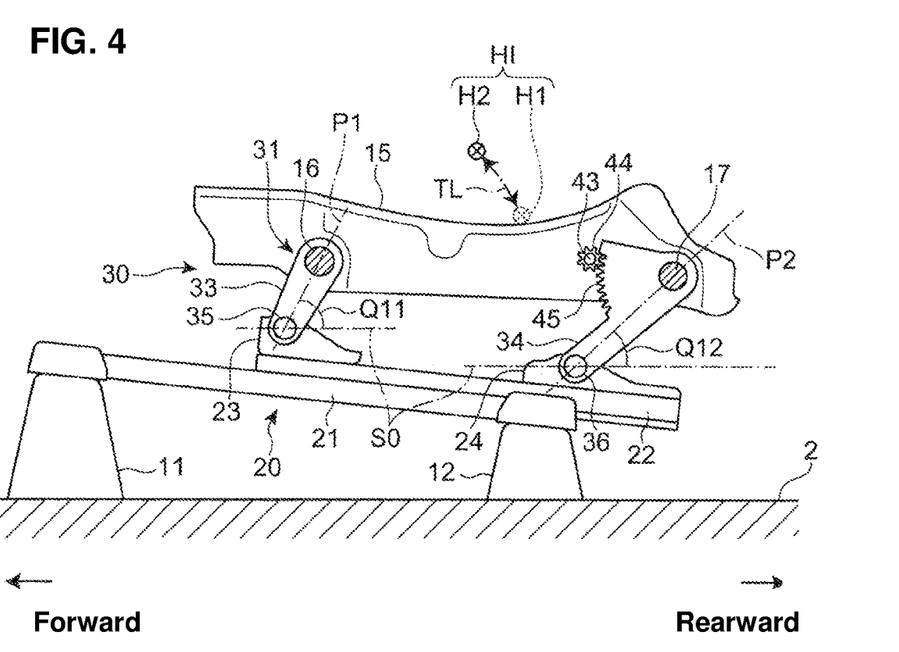
FIG. 4 is a side view showing a state where the seat is moved upward by the lift mechanism, which is similar to FIG. 2.

Referring to FIGS. 2 and 4, the structure of the lift mechanism 30 will be described. FIG. 2 shows the lift mechanism 30 when the seat body 13 is positioned at a lower end of an elevating/lowering range of the seat body 13, and FIG. 4 shows the lift mechanism 30 when the seat body 13 is positioned at an upper end of the elevating/lowering range of the seat body 13.

The lift mechanism 30 connects the slider 22 of the slide mechanism 20 to the seat cushion 14. The lift mechanism 30 is connected to the seat cushion 14 at a pair of right-and-left side frames 15 which make a framework of the seat cushion 14.

Herein, while only the right-side side frame 15 is illustrated in FIGS. 2 and 4, the left-side side frame is formed similarly.

The side frame 15 is provided to extend in the vehicle longitudinal direction at a side portion of the seat cushion 14. The side frame 15 is arranged along the slider 22 at a position located above and closely to the slider 22.

The right-and-left side frames 15 are interconnected via a pair of connecting shafts 16, 17 extending in the vehicle width direction, for example. The pair of connecting shafts 16, 17 are spaced apart from each other in the longitudinal direction. The front-side connecting shaft 16 is provided at a position, in the longitudinal direction, between a front end portion and a central portion of the side frame 15. The rear-side connecting shaft 17 is positioned near at a rear end of the side frame 15.

The lift mechanism 30 is provided with a link mechanism 31 which connects the slider 22 and the side frame 15. The link mechanism 31 comprises a front-side link member 33 and a rear-side link member 34. The link mechanism 31 is provided at each of the right and left sides of the seat.

Herein, while only the right-side link mechanism 31 (the right-side front-side link member 33 and the right-side rear-side link member 34) is illustrated in FIGS. 2 and 4, the left-side link mechanism is formed basically similarly.

The front-side link member 33 is a plate-shaped member extending linearly. A direction P1 where the front-side link member 33 extends (inclination angles Q1, Q11 of the front-side link member 33 relative to a vehicle horizontal plane S0) changes according to the position, in the vertical direction, of the seat body 13, but one end portion of the front-side link member 33 is always arranged in front of the other end portion of the front-side link member 33.

A front end portion of the front-side link member 33 is rotatably connected to the front-side bracket 23 of the slide mechanism 20 via a connecting pin 35 having an axial center extending in the vehicle width direction. A rear end portion of the front-side link member 33 is rotatably connected to the side frame 15 of the seat cushion 14 via the above-described front-side connecting shaft 16.

The rear-side link member 34 is a plate-shaped member extending linearly. The rear-side link member 34 is longer than the front-side link member 33. A direction P2 where the rear-side link member 34 extends (inclination angles Q2, Q12 of the rear-side link member 34 relative to the vehicle horizontal plane S0) changes according to the position, in the vertical direction, of the seat body 13, but one end portion of the rear-side link member 34 is always arranged in front of the other end portion of the rear-side link member 33.

A front end portion of the rear-side link member 34 is rotatably connected to the rear-side bracket 24 of the slide mechanism 20 via a connecting pin 36 having an axial center extending in the vehicle width direction. A rear end portion of the rear-side link member 34 is rotatably connected to the side frame 15 of the seat cushion 14 via the above-described rear-side connecting shaft 17.

As described above, the front-side link member 33 and the rear-side link member 34 are rotatably connected to the slide 22 via the brackets 23, 24 at their front end portions and rotatably connected to the side frame 15 at their rear end portions.

As shown in FIG. 2, the rear-side link member 34 which is one of the right-and-left rear-side link members 34 (the right-side link member 34 in the present embodiment) is configured to be rotatably driven by a drive mechanism 40. The drive mechanism 40 comprises an operational lever 41, a rotation control device 42, a drive shaft 43, a pinion gear 44, and a sector gear 45.

The operational lever 41 is arranged beside the seat cushion 14 (on the right side in the present embodiment). The operational lever 41 is provided to extend in the longitudinal direction such that its tip end portion is positioned forward and its base end portion is positioned rearward. The operational lever 41 is configured such that it is pulled up when the seat body 13 is elevated and it is pushed down when the seat body 13 is lowered. Further, the operational lever 41 is configured such that a biasing force generated by a biasing means (not illustrated) is applied thereto when operations for its pulling up or its pushing down are conducted by the occupant 100 and it is returned to its initial position by the above-described biasing force when applying an operational force thereto by the occupant 100 is released.

The drive shaft 43 is provided to extend in the vehicle width direction, and connected to the base end portion of the operational lever 41 via the rotation control device 42. When the operational lever 41 is pulled up, the drive shaft 43 is rotated clockwise in FIG. 2, and when the operational lever 41 is pushed down, the drive shaft 43 is rotated counter-clockwise in FIG. 2. When the drive shaft 43 is rotationally driven, the link mechanism 31 is operated as described later, so that the seat body 13 is elevated or lowered.

When the operational lever 41 is not operated, the rotation of the drive shaft 43 is restricted by the operation control device 42, so that it is suppressed that the seat body 13 is elevated or lowered by an intentional input of a vertical load or the like. Herein, since any known structure is possibly adopted as the rotation control device 42, describing its specific structure is omitted here.

The pinion gear 44 is provided on the drive shaft 43 so as to be rotated together with the drive shaft 43. The sector gear 45 is provided in back of and adjacently to the pinion gear 44 and engages with the pinion gear 44. The sector gear 45 is integrally provided with the rear-side link member 34, for example. However, the sector gear 45 may be fixed to the rear-side link member 34. Teeth of the sector gear 45 are arranged in a circumferential direction around a shaft center of the rear-side connecting shaft 17 at a front portion of the rear-side connecting shaft 17.

When the pinion gear 44 is rotated, together with the drive shaft 43, according to the operation of the operational lever 41, the sector gear 45 and the rear-side link member 34 are integrally rotated around the connecting shaft 17 in an opposite direction to the rotational direction of the pinion gear 44.

More specifically, when the pinion gear 44 is rotated clockwise in FIG. 2 according to the pulling-up operation of the operational lever 41, the sector gear 45 and the rear-side link member 34 are rotated counterclockwise around the connecting shaft 17 in FIG. 2. Herein, since moving of the front end portion of the rear-side link member 34 is restricted by the connecting pin 36, the rear-side link member 34 is rotated around the connecting shaft 17 and also rotated counterclockwise around the connecting pin 36 in FIG. 2.

Thereby, the rear-side link member 34 is rotationally driven such that the relative height of its rear end to its front end increases. Herein, the front-side link member 33 is also rotated in response to the rotation of the rear-side link member 34 such that the relative height of its rear end to its front end increases. Thus, the position of the front-and-rear link members 33, 34 changes from a lying position shown in FIG. 2, for example, to a rising position shown in FIG. 4, for example, so that the seat body 13 is elevated.

To the contrary, when the operational lever 41 is pushed down, the pinion gear 44 and the sector gear 45 are rotated in the opposite direction to the above-described direction, so that the front-and-rear link members 33, 34 are rotated in the opposite direction to the above-described direction. Thus, the position of the front-and-rear link members 33, 34 changes from the rising position shown in FIG. 4, for example, to the lying position shown in FIG. 2, for example, so that the seat body 13 is lowered.

Herein, another drive mechanism may be provided in place of the above-described drive mechanism 40. In this case, the drive mechanism may be electrical, not limited to being manual.

As shown in FIG. 2, when the seat body 13 is positioned at the lower end of the elevating/lowering range of the seat body 13, the side frame 15 of the seat cushion 14 is provided to slant forward and upward relative to the vehicle horizontal plane, corresponding to the rail 21 and the slider 22 of the slide mechanism 20.

Further, in the state shown in FIG. 2, the rear-side link member 34 is provided to slant rearward and slightly upward relative to the vehicle horizontal plane SO, so that it takes a lying position along the vehicle horizontal plane SO. Herein, it is preferable that the inclination angle Q2 of the longitudinal direction P2 of the rear-side link member 34 (an extensional direction of a straight line which connects an axial center of the connecting pin 36 and an axial center of the connecting shaft 17) be set at an angle within 0 to 10 degrees, and set at 5 degrees in an example shown in FIG. 2. Herein, the connecting pin 36 and the connecting shaft 17 are provided to overlap each other in the vehicle vertical direction.

Herein, since the link mechanism 31 is configured such that the front-side link member 33 is shorter than the rear-side link member 34, the radius of the rotational track of the front-side link member 33 is smaller than that of the rotational track of the rear-side link member 34. Accordingly, inclination of the seat face of the seat cushion 14 changes such that the relative height of its front end to its rear end decreases when the seat body 13 is elevated. Thereby, the knee's angle B of the occupant 100 is suppressed from becoming smaller than the appropriate range.

As shown in FIG. 4, when the seat body 13 is positioned at the lower end of the elevating/lowering range, the seat frame 15 of the seat cushion 14 is arranged substantially along the vehicle horizontal plane SO. At this time, the inclination angle Q12 of the rear-side link member 34 becomes greater than the inclination angle Q2 in the state shown in FIG. 2, within a range from 40 degrees to 50 degrees, for example. Further, at this time, the inclination angle Q11 of the front-side link member 33 becomes greater than the inclination angle Q1 in the state shown in FIG. 2, and also becomes greater than the inclination angle Q12 of the rear-side link member 34.

[Driving Position]

Figure 8:
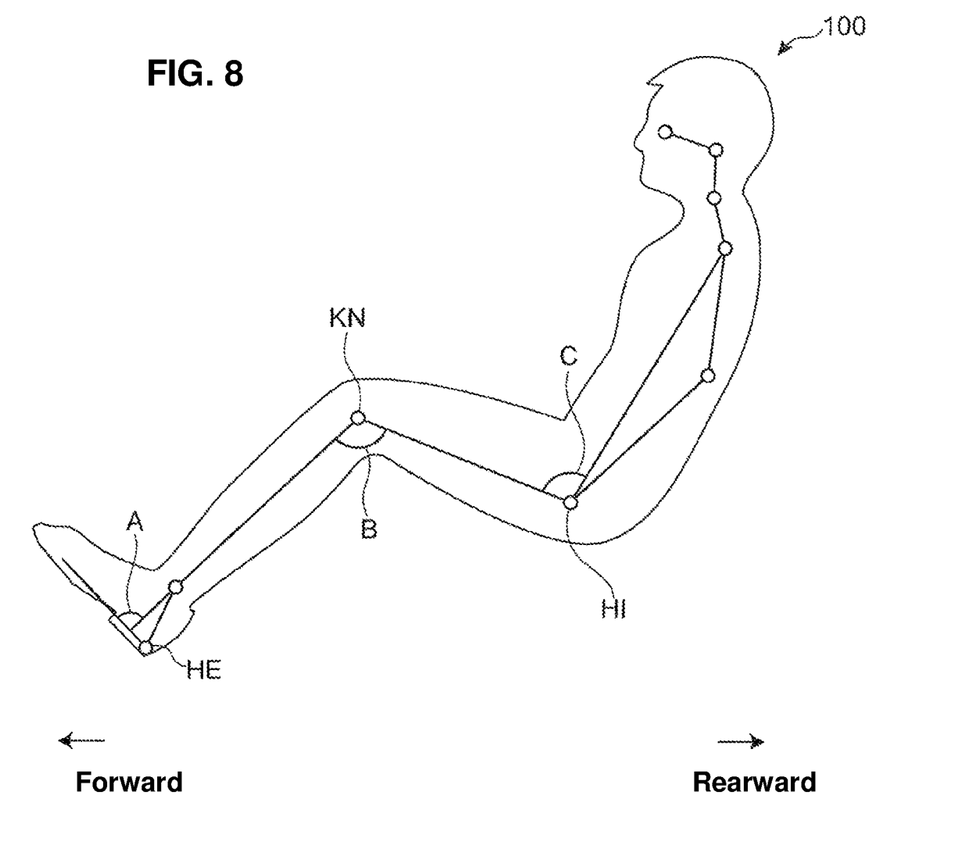
FIG. 8 is a side view showing respective joint's angles relating to a driving position of an occupant.

The driving position of the occupant 100 seated on the seat 10 (see FIG. 1) will be described referring to FIG. 8.

Each of the ankle's angle A, the knee's angle B, and the hip's angle C of the occupant 100, when viewed from the vehicle side, has the appropriate range for achieving the ideal driving position. The appropriate range of the ankle's angle A is generally within a range from 90 degrees to 100 degrees in a state where the occupant 100 just places a foot on the accelerator pedal 6 (see FIG. 1), without pressing the accelerator pedal 6 (an accelerator opening angle is zero), for example. The appropriate range of the knee's angle B is generally within a range from 119 degrees to 132 degrees, for example. The appropriate range of the hip's angle C is generally within a range from 90 degrees to 110 degrees, for example.

The ankle's angle A and the knee's angle B of the occupant 100 are determined based on a heel point HE, a knee point KN, and a hip point HI.

The heel point HE is determined at a single point according to the physique (body size) of the occupant 100 and the position of the accelerator pedal 6 (see FIG. 1). In the present embodiment, since the accelerator pedal 6 is fixed at a specified position of the vehicle 1, the heel point HE is determined at a single point according to the physique (body size) of the occupant 100 only.

Meanwhile, the hip point HI is determined according to the physique (body size) of the occupant 100 and the position of the seat body 13, and the heel point KN is determined according to the heel point HE and the hip point HI.

In the present descriptions, the heel point means a contact point of the heel with the vehicle floor when the occupant is seated in the seat, having a specified angle between a shoe sole surface and the accelerator. The knee point means the position of a knee joint of the occupant. The hip point means the position of a joint of a thighbone. For example, these points correspond to the followings in SAE mannequin defined in the standard by SAE (SAE Standard).

Heel Point: HOS (Heel of Shoe)
Knee Point: Intersection point of Leg Line and Thigh Line
Hip Point: H-Point Accordingly, by positioning the seat body 13 by the slide mechanism 20 and the lift mechanism 30, the heel point HE, the knee point KN, and the hip point HI are all determined, so that the ankle's angle A and the knee's angle B are determined.

Herein, since the hip's angle C changes according to the inclination of the upper half body of the occupant 100, this angle C is determined according to the inclination adjustment of the seat back 18 (see FIG. 1) by the reclining mechanism (not illustrated), in addition to the positioning of the seat body 13 by the slide mechanism 20 and the lift mechanism 30.

[Ideal Region of Hip Point]

An ideal region R1 where the hip point HI is arranged for achieving the ideal driving position is a region which can make the ankle's angle A and the knee's angle B fall in the above-described respective appropriate ranges.

Figure 5:
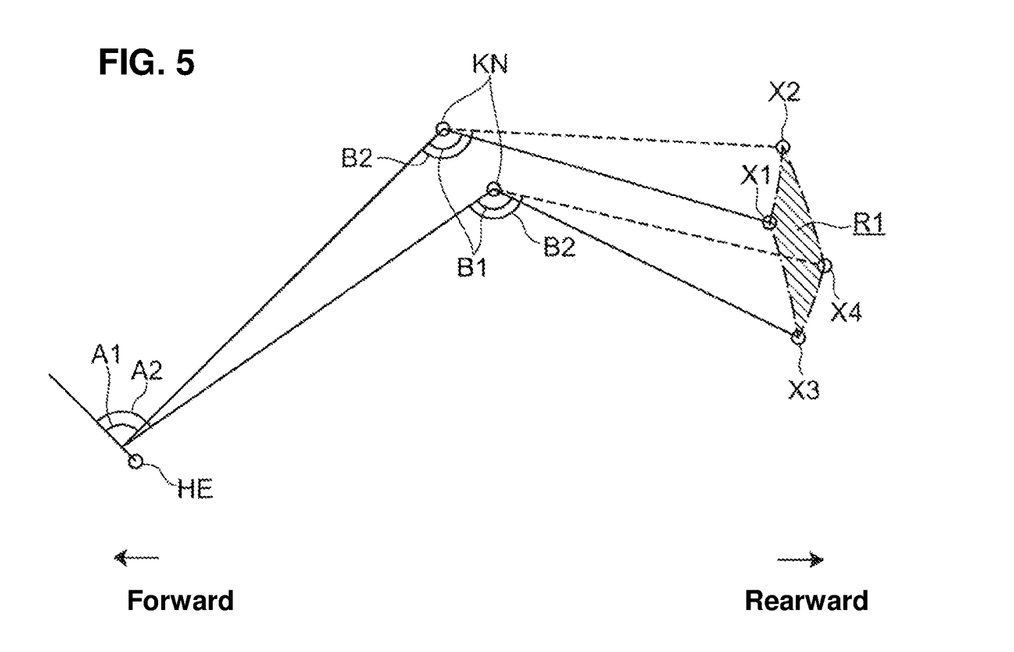
FIG. 5 is a diagram showing an ideal region of a hip point, when viewed from a vehicle side.

FIG. 5 shows an example of the ideal region R1 of the hip point HI, when viewed from the vehicle side. A setting method of the ideal region R1 shown in FIG. 5 is as follows.

First, a lower limit of the appropriate range of the ankle's angle A is set as a first ankle's angle A1, an upper limit of the appropriate range of the ankle's angle A is set as a second ankle's angle A2, a lower limit of the appropriate range of the knee's angle B is set as a first knee's angle B1, and an upper limit of the appropriate range of the knee's angle B is set as a second knee's angle B2. Further, the hip point HI when the ankle's angle A is the first ankle's angle A1 and the knee's angle B is the first knee's angle B1 is set as a first point X1, the hip point HI when the ankle's angle A is the first ankle's angle A1 and the knee's angle B is the second knee's angle B2 is set as a second point X2, the hip point HI when the ankle's angle A is the second ankle's angle A2 and the knee's angle B is the first knee's angle B1 is set as a third point X3, and the hip point HI when the ankle's angle A is the second ankle's angle A2 and the knee's angle B is the second knee's angle B2 is set as a fourth point X4.

In a case where the heel point HE is fixed at the single point, when the ankle's angle A falls in the appropriate region between the first ankle's angle A1 and the second ankle's angle A2 and also the knee's angle B falls in the appropriate region between the first knee's angle B1 and the second knee's angle B2, the hip point HI always falls in the region R1 enclosed by the first point X1, the second point X2, the third point X3, and the fourth point X4. Accordingly, this region R1 can be set as the ideal region of the hip point HI for achieving the ideal driving position.

Strictly speaking, in an outline of the ideal region R1 of the hip point HI, a line connecting the first point X1 and the second point X2 and a line connecting the third point X3 and the fourth point X4 are an arc having its center at the knee point KN, and a line connecting the first point X1 and the third point X3 and a line connecting the second point X2 and the fourth point X4 are an arc having its center at a rotational axis of a lower side of a lower part of a body (near the heel point HE).

Herein, a region enclosed by the line connecting the first point X1 and the second point X2, the line connecting the second point X2 and the fourth point X4, the line connecting the fourth point X4 and the third point X3, and the line connecting the third point X3 and the first point X1 may be set as the ideal region R1 of the hip point HI, for convenience.

[Track of Hip Point]

Figure 6:
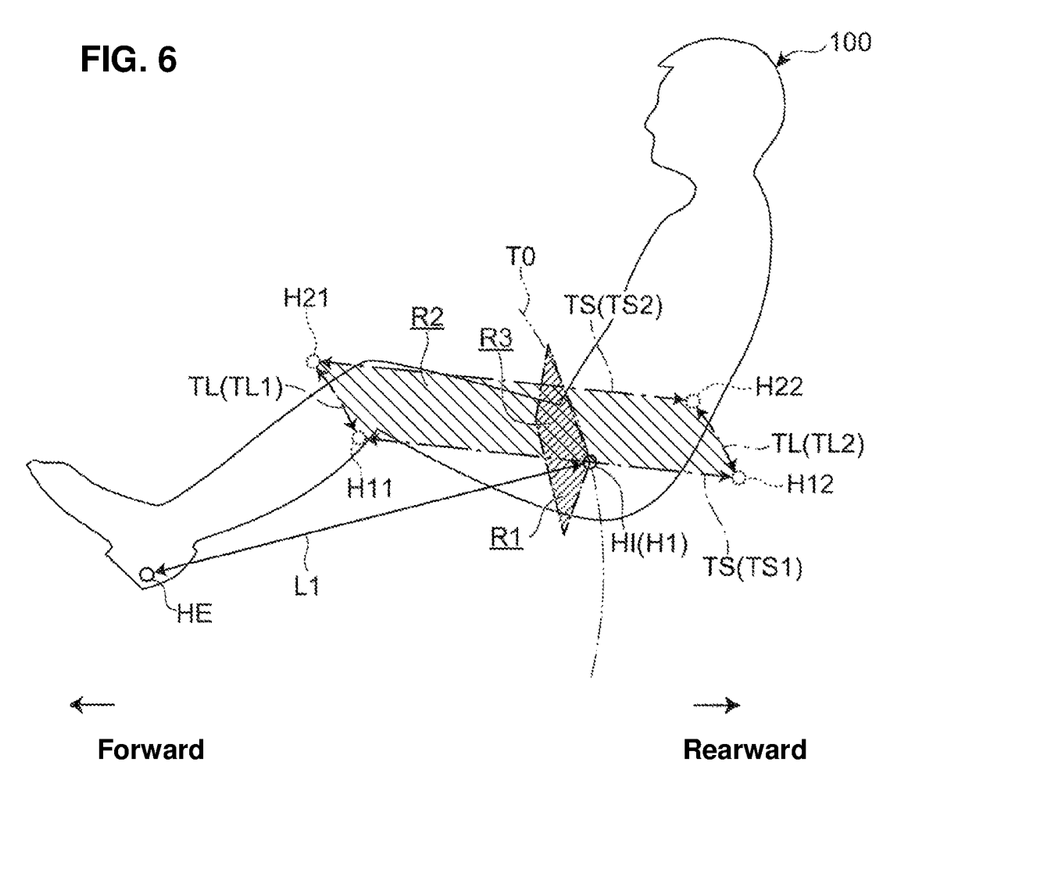
FIG. 6 is a diagram showing a move track of the hip point, when viewed from the vehicle side.

FIG. 6 is a side view showing a track TS of the hip point HI of the occupant 100 when the seat body 13 is slid by the above-described slide mechanism 20 and a track TL of the hip point HI of the occupant 100 when the seat body 13 is elevated/lowered by the above-described lift mechanism 30, when viewed from the vehicle side.

More specifically, FIG. 6 shows a first slide track TS1 which the hip point HI draws when the seat body 13 positioned at the lower end of the elevation/lowering range moves from a front end H11 to a rear end H12 of the slide range and a second slide track TS2 which the hip point HI draws when the seat body 13 positioned at the upper end of the elevation/lowering range moves from a front end H21 to a rear end H22 of the slide range as the track TS at the time of the slide move.

Further, FIG. 6 shows a first elevating/lowering track TL1 which the hip point HI draws when the seat body 13 positioned at the front end of the slide range moves from the lower end H11 to the upper end H21 of the elevating/lowering range and a second elevating/lowering track TL2 which the hip point HI draws when the seat body 13 positioned at the rear end of the slide range moves from the lower end H12 to the upper end H22 of the elevating/lowering range as the track TL at the time of the elevating/lowering.

Since the seat body 13 is movable within the specified slide range and the specified elevating/lowering range, the hip point HI of the occupant 100 always exists in a movable region R2 which is enclosed by the first slide track TS1, the second slide track TS2, the first elevating/lowering track TL1, and the second elevating/lowering track TL2.

In a case where the ideal region R1 of the hip point HI determined above and the movable region R2 where the hip point HI can be arranged overlap each other, the ideal driving position of the occupant 100 where the ankle's angle A falls in the appropriate range (the range from the first ankle's angle A1 to the second ankle's angle A2) and the knee's angle B falls in the appropriate range (the range from the first knee's angle B1 to the second knee's angle B2) can be achieved by positioning the hip point HI in this overlapping region R3.

[Designing of Seat]

Designing of the seat 10 will be conducted as follows for simplifying the adjustment of the driving position to make the hip point HI fall in the above-described overlapping region R3, for example.

First, the lower limit A1 and the upper limit A2 of the appropriate rage of the ankle's angle A and the lower limit B1 and the upper limit B2 of the appropriate rage of the knee's angle B are set, and the ideal region R1 (see FIG. 5) of the hip point HI of the specified physique occupant 100 are set based on these appropriate ranges by the above-described method.

Figure 7:
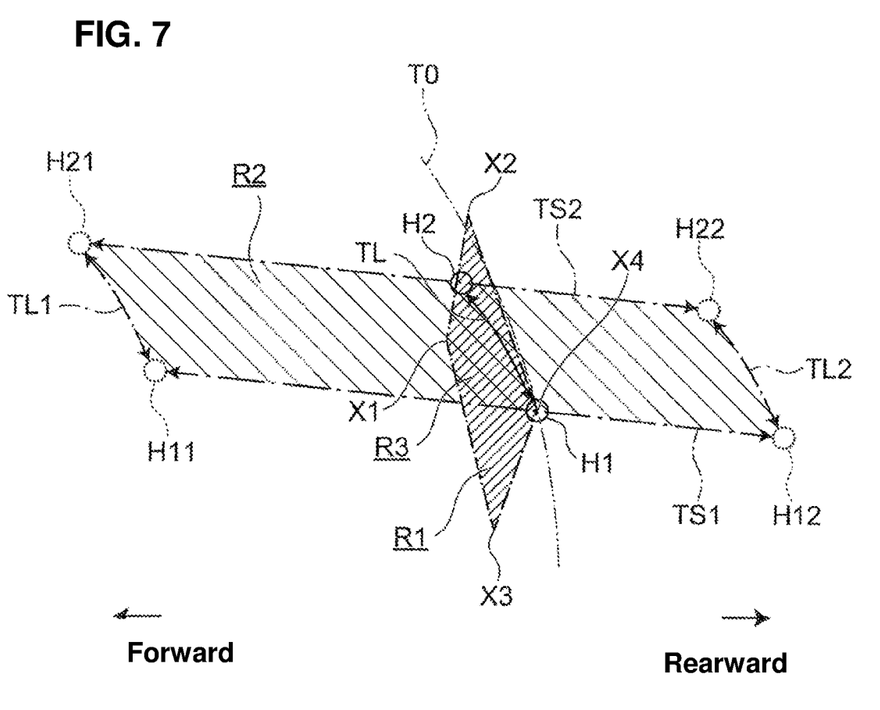
FIG. 7 is a diagram explaining a setting method of an elevating/lowering track of the hip point.

The position of the above-described set ideal region R1 of the hip point HI is a relative position to the heel point HE. As shown in FIGS. 6 and 7, this set ideal region R1 is a rectangular region enclosed by the four lines. The ideal region R1 is the elongated region having a shorter longitudinal length than a vertical length.

An average body size of an adult male may be adopted as the specified physique occupant 100, for example. As an example of this adopted body size, the physique of AM50 established by the United States Standard (the average body size of the U.S. adult male) is used.

Subsequently, the above-described overlapping region R3 is set. The overlapping region R3 is determined by the ideal region R1 of the hip point HI and a positional relation between the first slide track TS1 and the second slide track TS2. Accordingly, it is required that specific arrangements of the ideal region R1, the first slide track TS1, and the second slide track TS2 in the vehicle 1 are determined in order to set the overlapping region R3.

The arrangement of the ideal region R1 in the vehicle 1 is determined according to the heel point HE, and the heel point HE is determined based on the position of the accelerator pedal 6 (see FIG. 1). The arrangements of the first slide track TS1 and the second slide track TS2 in the vehicle 1 are determined according to the arrangement and shape of the seat body 13, the structure of the slide mechanism 20, the elevating/lowering range of the lift mechanism 30 and others.

A specific example of the arrangements of the first slide track TS1 and the second slide track TS2 in the setting of the overlapping region R3 will be described referring to FIG. 7.

In the example shown in FIG. 7, the first slide track TS1 is arranged such that it crosses the line connecting the first point X1 and the third point X3 at the outline of the ideal region R1 and also passes through the fourth point X4, and the second slide track TS2 is arranged such that it crosses the line connecting the first point X1 and the second point X2 and the line connecting the second point X2 and the fourth point X4 at the outline of the ideal region R1. In this case, a pentagonal region which is interposed between the first slide track TS1 and the second slide track TS2 in the ideal region R1 is set as the overlapping region R3.

Herein, the first slide track TS1 may be arranged such that it passes through a position which is upward or downward offset from the fourth point X4 of the ideal region R1. In a case where the first slide track TS1 is arranged such that it passes through the position which is downward offset from the fourth point X4, the outline of the ideal region R1 is hexagonal.

Herein, it is preferable that the eye position of the occupant 100 always fall in the appropriate eye-line zone Z1 (see FIG. 1) when the hip point HI of the above-described specified physique occupant 100 is positioned in the overlapping region R3. Accordingly, it is preferable that this point of view be considered in setting of the height of the first slide track TS1 and the second slide track TS2 (in setting of the elevating/lowering range).

Subsequently to the setting of the overlapping region R3, the track TL which the hip point HI draws when the seat body 13 is elevated/lowered by the lift mechanism 30 (hereafter, referred to as an "elevating/lowering track TL of the hip point HI" or the "elevating/lowering track TL") is set.

The elevating/lowering track TL of the hip point HI is determined according to the structure of the lift mechanism 30, such as the length and the inclination angle of the respective links 33, 34 and the distance between the front and rear link members 33, 34.

The elevating/lowering track TL of the hip point HI is set so as to fall in the overlapping region R3. For example, when a lower end H1 of the elevating/lowering track TL is arranged at a rear end (the fourth point X4 in the example shown in FIG. 7) of a portion of the first slide track TS1 which crosses the ideal region R1, an upper end H2 of the elevating/lowering track TL is arranged at a portion of the second slide track TS2 which crosses the ideal region R1.

By setting the elevating/lowering track TL as described above, the hip point HI of the specified physique occupant 100 can be always made to fall in the ideal region R1 when the seat body 13 positioned in a specified region, in the longitudinal direction, of the vehicle is elevated/lowered by the lift mechanism 30. In this case, when the seat body 13 whose longitudinal position is properly adjusted by the slide mechanism 20 is elevated or lowered by the lift mechanism 30, the ankle's angle A and the knee's angle B of the specified physique occupant 100 can be securely maintained in the respective appropriate ranges.

Further, according to the above-described setting of the elevating/lowering track TL, a change quantity of the ankle's angle A of the specified physique occupant 100 is restricted below a first threshold and a change quantity of the knee's angle B of the specified physique occupant 100 is restricted below a second threshold when the seat body 13 is elevated or lowered by the lift mechanism 30.

Herein, the above-described first threshold is an angle which corresponds to a difference between the upper limit A2 and the lower limit A1 in the appropriate range of the ankle's angle A, and the above-described second threshold is an angle which corresponds to a difference between the upper limit B2 and the lower limit B1 in the appropriate range of the knee's angle B.

Specifically, it is preferable that the first threshold be 5 degrees or greater and 15 degrees or smaller, which is set at 10 degrees, for example. It is preferable that the second threshold be 10 degrees or greater and 15 degrees or smaller, which is set at 13 degrees, for example. Herein, these thresholds are not to be limited to particular angles, particularly.

The elevating/lowering track TL of the hip point HI is set as described above, and then the respective specific structures of the seat 10 including the lift mechanism 30 is designed such that the seat body 13 is elevated or lowered so as to attain this set elevating/lowering track TL.

Since the ideal region R1 is the elongated region having the shorter longitudinal length (i.e., the longitudinally-narrow region) as described above, the overlapping region R3 which is part of the ideal region R1 has a shorter length in the longitudinal direction (see FIG. 7). Accordingly, it is required to configure the elevating/lowering track TL to be short in the longitudinal direction in order to make the elevating/lowering track TL fall in the overlapping region R3. The following can be considered as an example of the seat 10 to meet the above-described requirement.

As shown in FIG. 2, each of the rail 21 and the slider 22 of the slide mechanism 20 and the side frame 15 of the seat cushion 14 is configured to slant forward and upward relative to the vehicle horizon plane SO in the state where the seat body 13 is positioned at the lower end of the elevating/lowering range. Thereby, the front-and-rear link members 33, 34 of the lift mechanism 30 are arranged such that each of their front end portions connected to the slider 22 is located at a higher level and each of their rear end portions connected to the side frame 15 is located at a lower level, so that these link members 33, 34 take the lying position such that their rear end portions are located at the lower level than their front end portions.

More specifically, the front-side link member 33 is provided to take the lying position such that the connecting pin 35 supporting its front end portion and the connecting shaft 16 supporting its rear end portion overlap each other in the vertical direction. The rear-side link member 34 is provided to take the lying position such that the connecting pin 36 supporting its front end portion and the connecting shaft 17 supporting its rear end portion overlap each other in the vertical direction.

Accordingly, in order to elevate the seat body 13 from the position shown in FIG. 2, the connecting shafts 16, 17 draw the respective tracks including the arc portions having their tangential directions extending along the vertical direction in the longitudinally-narrow region when the front-and-rear link members 33, 34 and the connecting shafts 16, 17 are rotated around the connecting pins 35, 36. Herein, since the hip point HI of the occupant 100 is elevated together with the connecting shafts 16, 17 and the side frame 15, the hip point HI draws the elevating/lowering track TL in the longitudinally-narrow region as well (see FIG. 4).

Herein, as shown in FIG. 6, in a case where the hip point HI moves along a virtual rotational track TO around the heel point HE, a distance L1 between the heel point HE and the hip point HI is maintained constant, so that the ankle's angle A and the knee's angle B of the occupant 100 can be properly suppressed from changing.

Meanwhile, the radius of the actual elevating/lowering track TL of the hip point HI is determined according to the structures of the link mechanism 31, such as the rotational radius of the link members 33, 34. However, it is not realistic from a layout view point to configure the link members 33, 34 such that their length is substantially equal to the distance L1 between the heel point HE and the hip point HI. Accordingly, the radius of the elevating/lowering track TL of the hip point HI becomes considerably smaller than the radius of the above-described virtual rotational track TO.

Therefore, the conventional seat for a vehicle is configured such that deviation between the actual elevating/lowering track TL of the hip point HI and the virtual rotational track TO is large, which causes a large change of the ankle's angle A or the knee's angle B when the seat body 13 is elevated or lowered.

Meanwhile, according to the present embodiment, the elevating/lowering track TL of the hip point HI is set to be fall in the longitudinally-narrow overlapping region R3, the elevating/lowering track TL can be provided to be approximated to the above-described virtual rotational track TO as shown in FIG. 7. Therefore, the change (increase/decrease) of the distance L1 (see FIG. 6) between the heel point HE and the hip point HI of the occupant 100 can be suppressed effectively in the elevating/lowering of the seat body 13, so that the change of the ankle's angle A and the knee's angle B of the occupant 100 can be effectively suppressed.

Thus, according to the present embodiment, as long as the driving position is previously adjusted by the slide mechanism 20 so that the ankle's angle A and the knee's angle B of the occupant 100 fall in the appropriate range, even if the height adjustment is conducted by the lift mechanism 30 later, the ankle's angle A and the knee's angle B can be maintained within the appropriate range properly. Further, even if the ankle's angle A and the knee's angle B deviate from the appropriate range, this deviation can be reduced effectively. Therefore, readjusting by means of the slide mechanism 20 and the like can be omitted after the height adjustment by the lift mechanism 30, so that the adjustment of the driving position can be simplified.

While the present invention has been described referring to the above-described embodiment, the present invention is not to be limited to this embodiment.

For example, while the above-described embodiment shows the example (see FIG. 7) in which the elevating/lowering track TL is set so as to fall in the overlapping region R3 which is determined by the previously-set ideal region R1, the first slide track TS1, and the second slide track TS2 in the design of the seat 10, the step of setting the track of the hip point HI is not limited to this example. For example, the elevating/lowering track TL is set to fall in the ideal region R1 may be set first, and subsequently the first slide track TS1 and the second slide track TS2 may be set so as to pass through the upper end and the lower end of the elevating/lowering track TL.

Further, while the above-described embodiment shows the example in which the single ideal region R1 which corresponds to the single physique (body size) of the occupant is set and the seat 10 is configured such that the elevating/lowering track TL falls in the ideal region R1, plural ideal regions which correspond to plural physiques (body sizes) may be set and the seat 10 may be configured such that the elevating/lowering tracks of the respective hip points of the plural physiques (body sizes) falls in the respective ideal regions.

What is claimed is:

1. A seat for a vehicle, comprising:
a seat body arranged on a vehicle floor and including a seat cushion;
a slide mechanism provided between the vehicle floor and the seat cushion and capable of sliding the seat body within a specified range, in a longitudinal direction, of the vehicle; and
a lift mechanism provided between the slide mechanism and the seat cushion and capable of elevating/lowering the seat body within a specified range, in a vertical direction, of the vehicle, the lift mechanism including a link mechanism, the link mechanism being configured to be operated independently from the slide mechanism,
wherein said lift mechanism is configured such that a hip point of a specified physique occupant seated on said seat body which changes according to elevating/lowering of the seat body by the lift mechanism draws a track approximated to a virtual rotational track of the hip point around a heel point of the occupant when viewed from a vehicle side, whereby a change quantity of an angle of an ankle of the occupant is restricted below a first threshold and a change quantity of an angle of a knee of the occupant is restricted below a second threshold, and
a longitudinal component of the track is shorter than a vertical component of the track.

2. The seat for the vehicle of claim 1, wherein when said seat body positioned in a specified region, in the longitudinal direction, of the vehicle is elevated/lowered from one end to the other end of said specified range, in the vertical direction, of the vehicle by said lift mechanism, the track which the hip point of said occupant draws is arranged such that the angle of the ankle of the occupant falls in a first range and the angle of the knee of the occupant is falls in a second range when viewed from the vehicle side.

3. The seat for the vehicle of claim 1, wherein said slide mechanism comprises a rail which is attached to the vehicle floor and a slider which is interposed between the rail and said lift mechanism so as to slide along the rail, said seat cushion comprises a frame member which is provided to extend in the longitudinal direction along the slider, said lift mechanism comprises a link member which is rotatably connected to the slider at a front end portion thereof and rotatably connected to said frame member at a rear end portion thereof, said rail and said slider are provided to slant relative to a vehicle horizontal plane such that front sides thereof are located at a higher level than rear sides thereof, and said frame member is connected to said slider such that the frame member slants with a front side thereof being located at a higher level than a rear side thereof when the seat body is positioned at a lower end of said specified range, in the vertical direction, of the vehicle.

4. The seat for the vehicle of claim 2, wherein said slide mechanism comprises a rail which is attached to the vehicle floor and a slider which is interposed between the rail and said lift mechanism so as to slide along the rail, said seat cushion comprises a frame member which is provided to extend in the longitudinal direction along the slider, said lift mechanism comprises a link member which is rotatably connected to the slider at a front end portion thereof and rotatably connected to said frame member at a rear end portion thereof, said rail and said slider are provided to slant relative to a vehicle horizontal plane such that front sides thereof are located at a higher level than rear sides thereof, and said frame member is connected to said slider such that the frame member slants with a front side thereof being located at a higher level than a rear side thereof when the seat body is positioned at a lower end of said specified range, in the vertical direction, of the vehicle.

5. The seat for the vehicle of claim 3, wherein the front end portion of said link member is connected to said slider via a first axial member extending in a vehicle width direction, the rear end portion of said link member is connected to said frame member via a second axial member extending in the vehicle width direction, and said first axial member and said second axial member are provided to overlap each other in the vertical direction when the seat body is positioned at the lower end of the specified range, in the vertical direction, of the vehicle.

6. A seat for a vehicle, comprising:
   a seat body arranged on a vehicle floor and including a seat cushion;
   a slide mechanism provided between the vehicle floor and the seat cushion and capable of sliding the seat body within a specified range, in a longitudinal direction, of the vehicle; and
   a lift mechanism provided between the slide mechanism and the seat cushion and capable of elevating/lowering the seat body within a specified range, in a vertical direction, of the vehicle, the lift mechanism including a link mechanism, the link mechanism being configured to be operated independently from the slide mechanism,
   wherein said slide mechanism comprises a rail which is attached to the vehicle floor and a slider which is interposed between the rail and said lift mechanism so as to slide along the rail, said seat cushion comprises a frame member which is provided to extend in the longitudinal direction along the slider, said lift mechanism comprises a front-side link member and a rear-side link member which are provided to be spaced apart from each other in the longitudinal direction and rotatably connected to the slider at respective front end portions thereof and rotatably connected to said frame member at respective rear end portions thereof, the front-side link member being shorter than the rear-side link member, said rail and said slider are provided to slant relative to a vehicle horizontal plane such that front sides thereof are located at a higher level than rear sides thereof, said frame member is connected to said slider such that the frame member slants with a front side thereof being located at a higher level than a rear side thereof when the seat body is positioned at a lower end of said specified range, in the vertical direction, of the vehicle, the respective front end portions of said front-side and rear-side link members are connected to said slider via respective first axial members extending in a vehicle width direction, the respective rear end portions of said front-side and rear-side link members are connected to said frame member via respective second axial members extending in the vehicle width direction, and said respective first axial members and said respective second axial members are provided to overlap each other in the vertical direction when the seat body is positioned at the lower end of the specified range, in the vertical direction, of the vehicle, and
   a longitudinal component of the track is shorter than a vertical component of the track.

7. A designing method of a seat for a vehicle comprising a seat body, a slide mechanism capable of sliding the seat body within a specified range, in a longitudinal direction, of the vehicle, and a lift mechanism capable of elevating/lowering the seat body within a specified range, in a vertical direction, of the vehicle, the lift mechanism including a link mechanism, and the link mechanism is configured to be operated independently from the slide mechanism,
   wherein the seat for the vehicle is designed such that when said seat body is elevated/lowered by said lift mechanism, a change quantity of an angle of an ankle of a specified physique occupant seated on said seat body is restricted below a first threshold, a change quantity of an angle of a knee of the occupant is restricted below a second threshold when viewed from a vehicle side, and a longitudinal component of the track is shorter than a vertical component of the track.

8. The designing method of the seat for the vehicle of claim 7, wherein an ideal region of a hip point of said occupant when viewed from the vehicle side is set such that the angle of the ankle of the occupant falls in a first range and the angle of the knee of the occupant falls in a second range, and a structure of the seat for the vehicle is designed such that a track which said hip point of the occupant draws when said seat body positioned in a specified region, in the longitudinal direction, of the vehicle is elevated/lowered from one end to the other end of said specified range, in the vertical direction, of the vehicle by said lift mechanism is positioned in said ideal region when viewed from the vehicle side.

* * * * *